US012282903B1

(12) United States Patent
Kurani et al.

(10) Patent No.: US 12,282,903 B1
(45) Date of Patent: Apr. 22, 2025

(54) FORMAT TRANSFORMATION OF NON-FUNGIBLE TOKEN (NFT) VIA TRANSFER BY CONTAINERIZED DATA STRUCTURES

(71) Applicant: Wells Fargo Bank, N.A., San Francisco, CA (US)

(72) Inventors: Ashish B. Kurani, Hillsborough, CA (US); Dennis E. Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 86 days.

(21) Appl. No.: 18/083,284

(22) Filed: Dec. 16, 2022

(51) Int. Cl.
*G06Q 20/00* (2012.01)
*G06Q 20/06* (2012.01)
(Continued)

(52) U.S. Cl.
CPC ......... *G06Q 20/065* (2013.01); *H04L 9/0825* (2013.01); *H04L 9/14* (2013.01);
(Continued)

(58) Field of Classification Search
CPC .............. G06Q 20/065; G06Q 2220/00; H04L 9/0825; H04L 9/14; H04L 9/3213; H04L 2209/56; H04L 2209/60
(Continued)

(56) References Cited

U.S. PATENT DOCUMENTS

| 6,311,171 | B1 | 10/2001 | Dent |
| 10,946,283 | B1 | 3/2021 | Meilich et al. |

(Continued)

FOREIGN PATENT DOCUMENTS

| CN | 114358946 A | 4/2022 |
| EP | 3 654 578 A1 | 5/2020 |

(Continued)

OTHER PUBLICATIONS

Elimobile Launches the First Tokenized Telco, Partners with Elite Token to Create a Celebrity Powered Ecosystem, https://www.globenewswire.com/news-release/2022/05/16/2443461/0/en/Elimobile-Launches-the-First-Tokenized-Telco-Partners-with-Elite-Token-to-Create-a-Celebrity-Powered-Ecosystem.html, pp. 1-4.

(Continued)

*Primary Examiner* — Dante Ravetti
(74) *Attorney, Agent, or Firm* — Foley & Lardner LLP

(57) ABSTRACT

Aspects of this technical solution can include identifying an NFT linked with a first public and private key pair associated with the source account, having a transfer property indicating that the NFT is transferable from the source account, having a value property denominated in fiat currency, and having a volatility metric based on one or more requests to transfer the NFT prior to or concurrently with the request, transferring the NFT from the first public and private key pair to a second public and private key pair linked with the NFT transaction processor and associated with an institution account of the financial institution, generating a third public and private key pair linked with the second customer computing device and associated with the recipient account, and transferring the amount of currency from the second public and private key pair to the third public and private key pair.

9 Claims, 8 Drawing Sheets

(51) Int. Cl.
  *H04L 9/08* (2006.01)
  *H04L 9/14* (2006.01)
  *H04L 9/32* (2006.01)
(52) U.S. Cl.
  CPC ....... *H04L 9/3213* (2013.01); *G06Q 2220/00* (2013.01); *H04L 2209/56* (2013.01); *H04L 2209/60* (2013.01)
(58) Field of Classification Search
  USPC .................. 705/16, 21, 59; 380/44, 262
  See application file for complete search history.

(56) References Cited

U.S. PATENT DOCUMENTS

| | | |
|---|---|---|
| 11,139,955 B1 | 10/2021 | So et al. |
| 11,200,569 B1 | 12/2021 | James et al. |
| 11,334,876 B2 | 5/2022 | Yantis et al. |
| 11,972,415 B1 | 4/2024 | Panes |
| 12,033,120 B1 | 7/2024 | Stroke et al. |
| 2010/0329455 A1 | 12/2010 | Nemiroff |
| 2015/0046337 A1 | 2/2015 | Hu et al. |
| 2015/0287026 A1 | 10/2015 | Yang et al. |
| 2017/0024818 A1 | 1/2017 | Wager et al. |
| 2017/0180367 A1 | 6/2017 | Warren |
| 2018/0144122 A1 | 5/2018 | Dymond |
| 2018/0374087 A1 | 12/2018 | Lu et al. |
| 2019/0164221 A1 | 5/2019 | Hill et al. |
| 2020/0234267 A1 | 7/2020 | Sanders et al. |
| 2020/0302410 A1 | 9/2020 | MacGregor et al. |
| 2020/0356989 A1 | 11/2020 | Shamai et al. |
| 2021/0065293 A1 | 3/2021 | Sigler et al. |
| 2021/0119807 A1 | 4/2021 | Chen et al. |
| 2021/0133700 A1 | 5/2021 | Williams et al. |
| 2021/0256070 A1 | 8/2021 | Tran et al. |
| 2021/0319428 A1 | 10/2021 | Yantis et al. |
| 2021/0390531 A1 | 12/2021 | Voorhees et al. |
| 2022/0027902 A1 | 1/2022 | Vandenberg et al. |
| 2022/0075845 A1 | 3/2022 | Bowen et al. |
| 2022/0092599 A1 | 3/2022 | Sofaer |
| 2022/0101316 A1 | 3/2022 | Cramer |
| 2022/0108232 A1 | 4/2022 | Hardgrave et al. |
| 2022/0114600 A1 | 4/2022 | Blackburn et al. |
| 2022/0122062 A1 | 4/2022 | Mayblum et al. |
| 2022/0138760 A1 | 5/2022 | Dipasquale |
| 2022/0138849 A1 | 5/2022 | Henson et al. |
| 2022/0164815 A1 | 5/2022 | Petersen et al. |
| 2022/0172287 A1 | 6/2022 | Jung |
| 2022/0173893 A1 | 6/2022 | Basu et al. |
| 2022/0230175 A1 | 7/2022 | Haruna et al. |
| 2022/0253834 A1 | 8/2022 | Vijayan |
| 2023/0017499 A1 | 1/2023 | Agrawal |
| 2023/0073545 A1 | 3/2023 | Kurian et al. |
| 2023/0106751 A1 | 4/2023 | Wainstein et al. |
| 2023/0108610 A1 | 4/2023 | Tang et al. |
| 2023/0121749 A1 | 4/2023 | Lee |
| 2023/0124040 A1 | 4/2023 | Quigley et al. |
| 2023/0130594 A1 | 4/2023 | Quigley et al. |
| 2023/0137867 A1 | 5/2023 | Walters et al. |
| 2023/0139878 A1 | 5/2023 | Clark et al. |
| 2023/0162188 A1 | 5/2023 | Silver |
| 2023/0163975 A1 | 5/2023 | Kelly et al. |
| 2023/0281585 A1* | 9/2023 | Kechik ................ G06F 16/20 705/51 |
| 2023/0289820 A1 | 9/2023 | Boardman et al. |
| 2023/0298001 A1 | 9/2023 | Jethmalani et al. |
| 2023/0315819 A1 | 10/2023 | Guy et al. |
| 2023/0318851 A1 | 10/2023 | Kojima et al. |
| 2024/0005320 A1 | 1/2024 | Pardo |
| 2024/0007309 A1 | 1/2024 | Dowling et al. |
| 2024/0013195 A1 | 1/2024 | Osborn et al. |
| 2024/0020682 A1 | 1/2024 | Castagna et al. |
| 2024/0144331 A1 | 5/2024 | Perelmuter |
| 2024/0152905 A1 | 5/2024 | Franco et al. |
| 2024/0330376 A1 | 10/2024 | Solh et al. |

FOREIGN PATENT DOCUMENTS

| | | |
|---|---|---|
| EP | 4 012 970 A1 | 6/2022 |
| WO | WO-2023/069689 A2 | 4/2023 |

OTHER PUBLICATIONS

Fazli et al., "Under the Skin of Foundation NFT Auctions," https://arxiv.org/abs/2109.12321, pp. 1-4.

Frankenfield, "Is SALT Blockchain-Based Lending the Future of All Personal Loans?," https://www.investopedia.com/tech/salt-secured-automated-lending-technology-blockchain/, pp. 1-10.

Hartmann, Torsten, "What Are NFT Loans? Where Can You Get an NFT-backed Loan," (May 9, 2022), https://captainaltcoin.com/nft-loans/, pp. 1-10.

Musan, "NFT.finance Leveraging Non-Fungible Tokens," https://www.imperial.ac.uk/media/imperial-college/faculty-of-engineering/computing/public/1920-ug-projects/distinguished-projects/NFT.-finance-Leveraging-Non-Fungible-Tokens.pdf, pp. 1-85.

Patairya, "How Do You Assess the Value of an NFT," https://cointelegraph.com/news/how-do-you-assess-the-value-of-an-nft, pp. 1-12.

Steinwold, "NFT Valuation, Lending & Borrowing: Putting Non-Fungible Assets to Work," o https://medium.com/@Andrew.Steinwold/nft-valuation-lending-borrowing-putting-non-fungible-assets-to-work-ce92c61bad50, pp. 1-6.

Sangam Bhujel, A Survey: Security, Transparency, and Scalability Issues of N FT's and Its Marketplaces, Nov. 2022, https://www.ncbi.nlm.nih.gov/pmc/articles/PMC9696178/pdf/sensors-22-08833.pdf (Year: 2022).

* cited by examiner

FORMAT TRANSFORMATION OF NON-FUNGIBLE TOKEN (NFT) VIA TRANSFER BY CONTAINERIZED DATA STRUCTURES

TECHNICAL FIELD

The present implementations relate generally to electronic networks, and more particularly to format transformation of non-fungible token (NFT) via transfer by containerized data structures.

INTRODUCTION

Consumers increasingly expect to conduct financial transactions involving multiple types of transaction denominations. Consumers increasingly expect to transfer assets across types that have values based on differing denominations. However, conventional systems cannot identify market characteristics that drive value of various digital assets, cannot accurately generate values for various digital assets classes with various scarcity characteristics, and cannot effectively execute transactions involving various digital assets.

SUMMARY

At least one aspect is directed to a method of transferring an NFT in a financial institution from a source account associated with a first customer computing device to a recipient account associated with a second customer computing device. The method can include registering, by an account processor, a non-fungible token (NFT) account to a customer associated with the first customer computing device. The method can include receiving, by a mobile wallet computing system from the first customer computing device, a request to transmit an amount of fiat currency from the source account to the recipient account. The method can include identifying, by an NFT transaction processor, an NFT linked with a first public and private key pair associated with the source account, having a transfer property indicating that the NFT is transferable from the source account, having a value property denominated in fiat currency, and having a volatility metric based on one or more requests to transfer the NFT prior to or concurrently with the request. The method can include determining, by the NFT transaction processor, that a modified value property of the NFT based on the value property and the volatility metric satisfies a threshold based on the amount of fiat currency. The method can include transferring, by the NFT transaction processor in response to the determining, the NFT from the first public and private key pair to a second public and private key pair linked with the NFT transaction processor and associated with an institution account of the financial institution. The method can include generating, by the NFT transaction processor, a third public and private key pair linked with the second customer computing device and associated with the recipient account. The method can include transferring, by the NFT transaction processor in response to the determining, the amount of fiat currency from the second public and private key pair to the third public and private key pair.

At least one aspect is directed to a computing system for transferring an NFT in a financial institution from a source account associated with a first customer computing device to a recipient account associated with a second customer computing device. The system can include a database, where the database comprises an overlay ledger. The system can a memory configured to store instructions. The system can a processor, the instructions executable by the processor and that, when executed by the processor, cause the processor. The system can register a non-fungible token (NFT) account to a customer associated with the first customer computing device. The system can receive, from the first customer computing device, a request to transmit an amount of fiat currency from the source account to the recipient account. The system can identify an NFT linked with a first public and private key pair associated with the source account, having a transfer property indicating that the NFT is transferable from the source account, having a value property denominated in fiat currency, and having a volatility metric based on one or more requests to transfer the NFT prior to or concurrently with the request. The system can determine that a modified value property of the NFT based on the value property and the volatility metric satisfies a threshold based on the amount of fiat currency. The system can transferring, in response to the determining, the NFT from the first public and private key pair to a second public and private key pair linked with the NFT transaction processor and associated with an institution account of the financial institution. The system can generate a third public and private key pair linked with the second customer computing device and associated with the recipient account. The system can transfer, in response to the determining, the amount of fiat currency from the second public and private key pair to the third public and private key pair.

At least one aspect is directed to a computer readable medium can include one or more instructions stored thereon and executable by a processor. The processor can register, a non-fungible token (NFT) account to a customer associated with the first customer computing device. The processor can receive, from the first customer computing device, a request to transmit an amount of fiat currency from the source account to the recipient account. The processor can identify, an NFT linked with a first public and private key pair associated with the source account, having a transfer property indicating that the NFT is transferable from the source account, having a value property denominated in fiat currency, and having a volatility metric based on one or more requests to transfer the NFT prior to or concurrently with the request. The processor can determine that a modified value property of the NFT based on the value property and the volatility metric satisfies a threshold based on the amount of fiat currency. The processor can transfer, in response to the determining, the NFT from the first public and private key pair to a second public and private key pair linked with the NFT transaction processor and associated with an institution account of the financial institution. The processor can generate, a third public and private key pair linked with the second customer computing device and associated with the recipient account. The processor can transfer, in response to the determining, the amount of fiat currency from the second public and private key pair to the third public and private key pair.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

NFT transfer processes can include multiple validation and authentication layers. However, various validation and authentication layers can potentially reduce transfer speeds and thus reduce effectiveness of NFTs as a transfer medium or transaction medium. Further, NFTs are part of an increasingly diverse transfer and transaction network environment, and interoperability in transfer infrastructure of NFTs with other types and classes of system objects is of increasing importance.

NFT transfer processes can include multiple validation and authentication layers. However, various validation and authentication layers can potentially reduce transfer speeds and thus reduce effectiveness of NFTs as a transfer medium or transaction medium. Further, NFTs are part of an increasingly diverse transfer and transaction network environment, and interoperability in transfer infrastructure of NFTs with other types and classes of system objects is of increasing importance.

Figure 1:
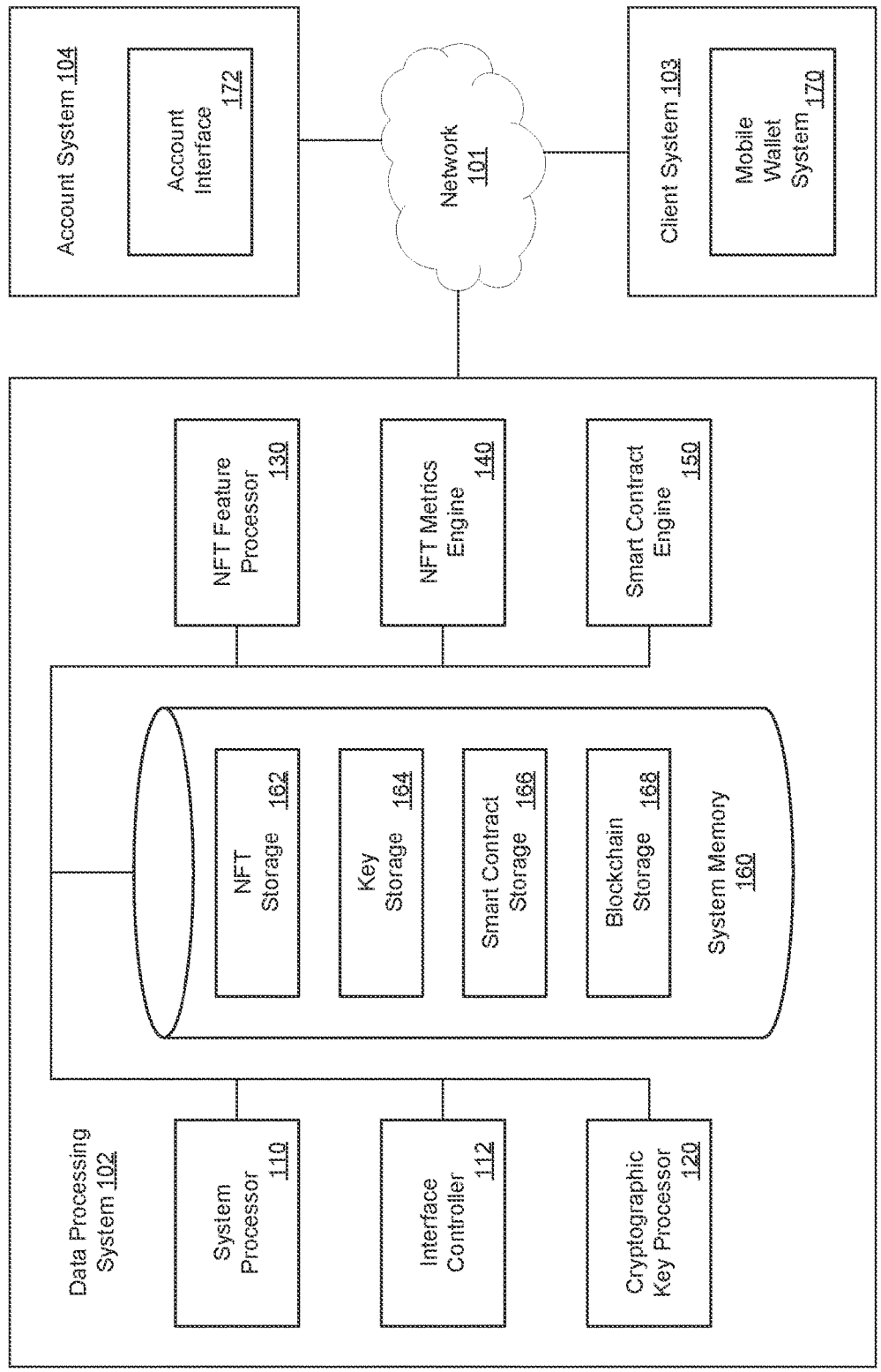
FIG. 1 depicts an example system, in accordance with present implementations.

FIG. 1 depicts an example system, in accordance with present implementations. As illustrated by way of example in FIG. 1, an example system 100 can include at least a network 101, a data processing system 102, a client system 103, and an account system 104.

The network 101 can include any type or form of network. The geographical scope of the network 101 can vary widely and the network 101 can include a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include an overlay network which is virtual and sits on top of one or more layers of other networks 101. The network 101 can include any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can include a type of a broadcast network, a telecommunications network, a data communication network, or a computer network.

The data processing system 102 can include a physical computer system operatively coupled or that can be coupled with one or more components of the system 100, either directly or directly through an intermediate computing device or system. The data processing system 102 can include a virtual computing system, an operating system, and a communication bus to effect communication and processing. The data processing system 102 can include a system processor 110, an interface controller 112, a cryptographic key processor 120, an NFT feature processor 130, an NFT metrics engine 140, a smart contract engine 150, and a system memory 160. a system processor 110, an interface controller 112, a cryptographic key processor 120, an NFT feature processor 130, an NFT metrics engine 140, a smart contract engine 150, and a system memory 160.

The system processor 110 can execute one or more instructions associated with the system 100. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. For example, the one or more instructions can include one or more of firmware, software, hardware, operating systems, embedded operating systems. The system processor 110 or the system 100 generally can include one or more communication bus controller to effect communication between the system processor 110 and the other elements of the system 100.

For example, the processor can transfer an NFT difference from the second public and private key pair to the first public and private key pair, the NFT difference equal to a difference between the amount of fiat currency and the modified value property. For example, the processor can determine that the volatility metric indicates a lower volatility than one or more corresponding volatility metrics of a plurality of NFTs can include the NFT. The system can selecting, by the NFT transaction processor from among the plurality of NFTs and in response to the determining that the volatility metric indicates the lower volatility, the NFT. For example, the processor can determine, based on one or more requests to transfer corresponding ones of the plurality of NFTs, the corresponding volatility metrics of the plurality of NFTS. For example, the processor can determine that the value property indicates a higher value than one or more corresponding value properties of a plurality of NFTs can include the NFT. The system can select, from among the plurality of NFTs and in response to the determining that the value property indicates the higher value, the NFT. For example, the processor can generate, based on the first public and private key pair, the transfer property to indicate that the NFT is transferable from the source account. For example, the processor can scale the value property by the volatility metric into the modified value property.

For example, the processor can receive by, via a communication interface compatible with an NFT transfer system external to the NFT transaction processor, the requests to transfer the NFT prior to or concurrently with the request. For example, the processor can determine that a second NFT has a transfer property indicating that the second NFT is restricted to the source account. The system can blocking, in response to the determining that the second NFT has the transfer property indicating that the second NFT is restricted to the source account, selecting the NFT. For example, the processor can transfer an NFT difference from the second public and private key pair to the first public and private key pair, the NFT difference equal to a difference between the amount of fiat currency and the modified value property.

The interface controller 112 can link the data processing system 102 with one or more of the network 101, the client system 103, and the account system 104, by one or more communication interfaces. A communication interface can include, for example, an application programming interface ("API") compatible with a particular component of the data processing system 102, the client system 103, or the account system 104. The communication interface can provide a particular communication protocol compatible with a particular component of the data processing system 102 and a particular component of the client system 103 or the account system 104. The interface controller 112 can be compatible with particular content objects, and can be compatible with particular content delivery systems corresponding to particular content objects. For example, the interface controller 112 can be compatible with transmission of video content, audio content, or any combination thereof. For example, the interface controller 112 can be compatible with payment processing transmissions by a protocol compatible with payment processing latency and encryption structures.

The cryptographic key processor 120 can generate and modify cryptographic keys. For example, the cryptographic key processor 120 can include one or more asymmetric or symmetric key generators, and can generate public-private key pairs. For example, a public-private key pair can include a public key configured to encrypt in accordance with a particular transform process. For example, a public-private key pair can include a private key configured to decrypt in accordance with a particular transform process compatible with the public key. The cryptographic key processor 120 can link the public-private key pair with any individual object or component. The cryptographic key processor 120 can link any public key or private key corresponding to the public-private key pair with any individual object or component. For example, the cryptographic key processor 120 can generate a key compatible with or linked with a particular identifier corresponding to a particular, device, user, customer, account, system, or any combination thereof.

The NFT feature processor 130 can identify one or more characteristics of one or more NFTs. For example, the feature processor 130 can identify one or more characteristics of an individual NFT or a plurality of NFTs satisfying one or more criteria. The NFT feature processor 130 can generate a particular feature corresponding to one or more characteristics of an NFT or an object linked with the NFT. For example, a feature can include a scalar or vector quantity corresponding to one or more vales of an aspect of an NFT. For example, a feature can include a list of coordinates corresponding to a line identified in an image linked with an NFT. For example, a feature can include a numeric value corresponding to an identifier of an NFT. For example, criteria by which NFTs can be identified can include aspects of the NFT, fields or components of the NFT, transform processes used to generate or modify the NFT, aspects of a content object linked with the NFT, or any combination thereof. For example, aspects of the NFT can include a hash of the NFT, or a value of an individual field of the NFT. For example, aspects of the NFT can include a hash of the NFT, or a value of an individual field of the NFT. For example, aspects of a content object linked with the NFT can include a bitmap of an image linked with the NFT, or a hash of a media content linked with the NFT. Media content can include images, audio, three-dimensional (3D) models, or any combination thereof.

The NFT metrics engine 140 can generate and modify one or more metrics based on one or more NFTs. For example, the NFT metrics engine 140 can generate a metric based one or more features obtained from the NFT feature processor 130. For example, the NFT metrics engine 140 can generate a metric to indicate a particular value or type of a particular NFT. The NFT metrics engine 140 can generate metrics compatible with particular thresholds. For example, the thresholds can activate particular transforms of an aspect of an NFT, feature or metric. For example, the thresholds can execute one or more instructions corresponding to a particular NFT or type of NFT, type of object linked an NFT, or any combination thereof. For example, the NFT metrics engine 140 can determine that a particular metric having a particular value and based on a type of an NFT satisfies a threshold that indicates a particular value compatible with the particular value of the metric.

The smart contract engine 150 can generate and modify one or more smart contracts. The smart contract engine 150 can execute instructions to generate or modify a cryptographic container, to add or remove objects from a cryptographic container, and to execute various processors linked with or embedded with a smart contract. For example, the smart contract engine 150 can execute various processors of a smart contract in response to an indication from the NFT metrics engine 140 that a metric satisfies a particular threshold. For example, the smart contract engine 150 can execute various processors of a smart contract in response to detecting input including or corresponding to a particular token at the smart contract. For example, the smart contract engine 150 can include processors to read, write, generate, or modify one or more objects contained within a container of the smart contract, one or more tokens input to the smart contract, or one or more processors of the smart contract.

The system memory 160 can store data associated with the system 100. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, and a NAND memory device. The system memory 160 can include one or more addressable memory regions disposed on one or more physical memory arrays. A physical memory array can include a NAND gate array disposed on, for example, at least one of a particular semiconductor device, integrated circuit device, and printed circuit board device. The system memory 160 can include an NFT storage 162, a key storage 164, a smart contract storage 166, and a blockchain storage 168, an NFT storage 162, a key storage 164, a smart contract storage 166, and a blockchain storage 168.

The NFT storage 162 can include NFTs associated with the data processing system 102 or any component thereof, the client system 103 or any component thereof, any content object, or any combination thereof. The key storage 164 can store cryptographic keys associated with the data processing system 102 or any component thereof, the client system 103 or any component thereof, any content object, or any combination thereof. For example, the key storage 164 can include public-private key pairs or private keys corresponding to particular accounts, NFTs, smart contracts, devices, users, systems, or any combination thereof. The smart contract storage 166 can store one or more smart contracts and corresponding addresses for particular smart contracts that indicate links with the corresponding smart contracts. The blockchain storage 168 can store one or more blockchains linked to one or more smart contracts, tokens, containers, or content objects, by corresponding addresses for particular smart contracts, tokens, containers, or content objects that indicate links with a particular blockchain.

The client system 103 can include a computing system located remotely from the data processing system 102. The client system 103 can include a mobile wallet system 170. The mobile wallet system 170 can include an interface to execute instructions corresponding to a particular wallet account, and to modify the structure or contents of a particular smart contract corresponding to a wallet account. For example, the mobile wallet system 170 can include a user interface to receive input that indicates selections of various NFTs, transactions, accounts, devices, users, or systems. For example, the user interface can include a graphical user interface that can be presented at a display device. The display device can display at least one or more user interface presentations, and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The mobile wallet system 170 can transmit one or more instructions, tokens, keys, or any combination thereof to, from, or with the data processing system 102.

The account system 104 can generate and modify various data structures corresponding to accounts linked with various entities. For example, the account system 104 can manage or execute various cryptographic keys linked with various accounts. The account system 104 can modify links between particular cryptographic keys or asymmetric key pairs and various accounts. The account system 104 can restrict modification of any account or any content object or NFT linked with a particular account, to requests including or referencing cryptographic keys linked with the account. The account system 104 can include an account interface 172.

The account interface 172 can communicate with one or more external systems compatible with allocating an NFT. For example, the account interface 172 can include an application programming interface (API) compatible with the account system 104 and the interface controller 112. For example, the account interface 172 can be configured to receive characteristics associated with particular NFTs, accounts, or content objects linked with particular NFTs. For example, the account interface 172 can be configured to receive identifiers corresponding to various NFTs linked with a particular account, account control instructions, currency or asset transfer instruction, or any combination thereof. The account interface 172 can thus provide the technical improvement of detecting and transmitting metrics generated to allocate an NFT between storage locations or blockchain locations. The account interface 172 can provide the technical improvement of providing a communication interface compatible with particular NFT transfer operations.

Figure 2:
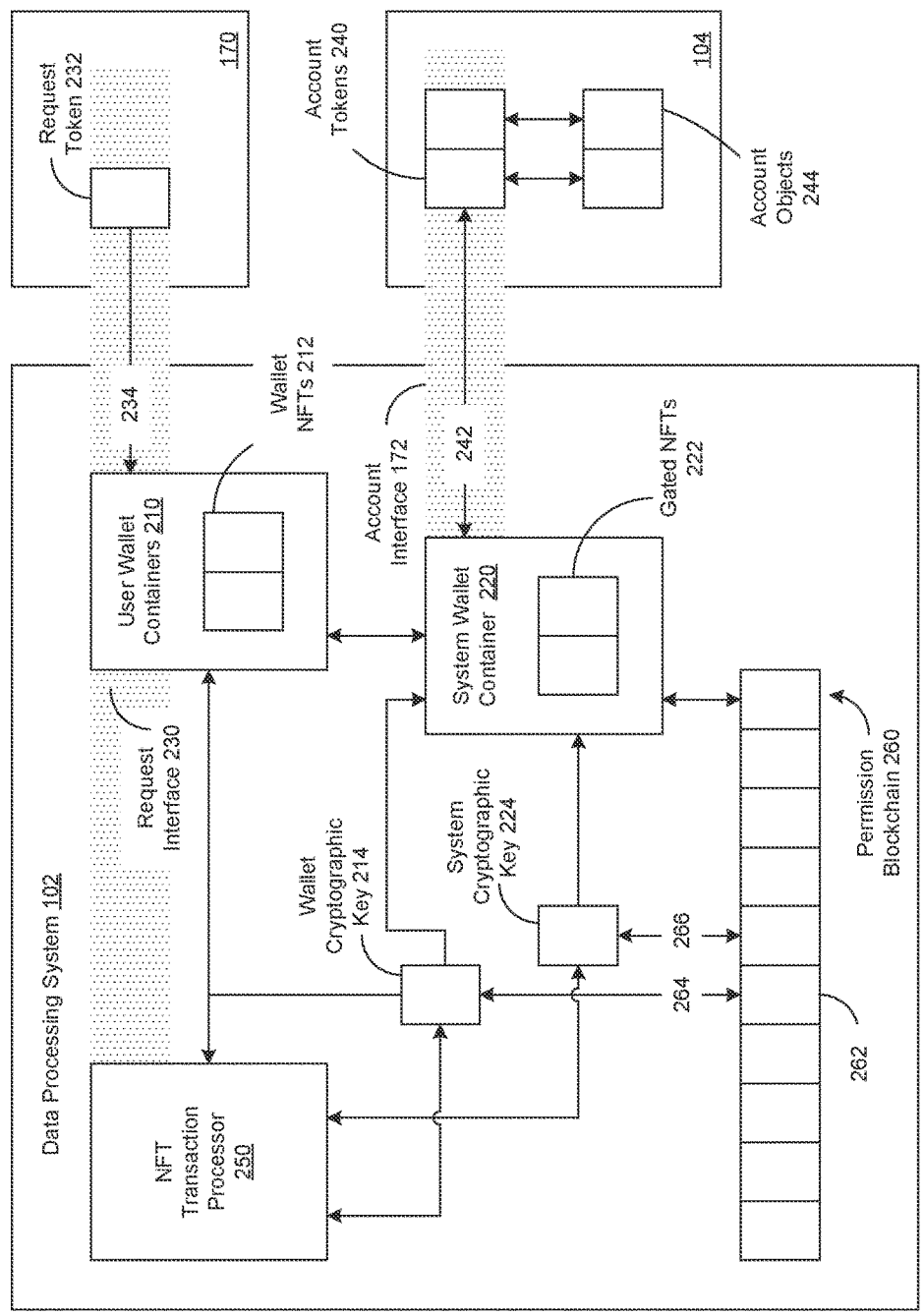
FIG. 2 depicts an example system architecture, in accordance with present implementations.

FIG. 2 depicts an example system architecture, in accordance with present implementations. As illustrated by way of example in FIG. 2, an example system architecture 200 can include at least the data processing system 102, the account system 104, the mobile wallet system 170, user wallet containers 210, a wallet cryptographic key 214, a system wallet container 220, currency objects 222, a system cryptographic key 224, a request interface 230, an account tokens 240, an account transmission 242, account objects 244, an NFT transaction processor 250, and a permission blockchain 260.

The user wallet containers 210 can each include one or more NFTs and keys corresponding to a various accounts and linked with a particular user or device. For example, the wallet container 210 can encapsulate one or more NFTs linked with a particular user within a secure container, and can include an interface compatible with the NFT transaction processor 250, the NFT account system 104, and the account interface 170. The wallet container 210 can each include wallet NFTs 212. The wallet NFTs 212 can each include a particular NFT and can correspond to particular content objects. An NFT of the wallet NFTs 212 can be associated with a particular content object, and can be required to transmit output of the content object, transfer the content object to another storage location, or any combination thereof, for example. Each of the wallet NFTs 212 can indicate control of a particular content by a particular user linked with the wallet container 210 via a cryptographic key or key pair. The wallet container 210 can include one or more wallet NFTs 212.

The wallet cryptographic key 214 can include a key compatible with the wallet container 210. The wallet container 210 can execute a transaction or modify contents of the wallet container 210 in response to detecting input including the wallet cryptographic key 214. The wallet cryptographic key 214 can, for example, include a public-private key pair, a public key, or a private key compatible with the wallet container 210. The wallet container 210 can permit access to the wallet NFTs 212 based on the wallet cryptographic key 214, for example, compatible with the encapsulation layer and operable to decrypt the encryption corresponding to the encapsulation layer.

The system wallet container 220 can include one or more NFTs and keys corresponding to a various accounts and linked with a particular financial institution or device. The system wallet container 220 can correspond at least partially in one or more of structure and operation to the user wallet containers 210. The system wallet container 220 can include one or more gated NFTs 222. The gated NFTs 222 can each include a particular NFT and can correspond to particular content objects. An NFT of the gated NFTs 222 can be transferred from or to the wallet container 210, for example. For example, each of the gated NFTs 222 can indicate control of a particular content by a particular user linked with the NFT smart contract 220 via the system cryptographic key 224.

The system cryptographic key 224 can include a key compatible with and controlled by the data processing system 102. Transmission of the system cryptographic key 224 can be restricted by the data processing system 102 to within the data processing system 102. For example, the system cryptographic key 224 can correspond to a "backup key" or "house key" that must be detected in order to activate processors or decrypt containers of the NFT smart contract 220. Thus, the system cryptographic key 224 can restrict authorization by the NFT smart contract 220 to the data processing system 102 environment.

The request interface 230 can include a communication channel between one or more of the smart contract control structure 210, the system cryptographic key 224 at the data processing system 102, and the request token 232 at the mobile wallet system 170. The request interface 230 can include an application programming interface compatible with the wallet container 210 to detect the system cryptographic key 224 at the data processing system 102, and the request token 232 at the client system 103. At least the request interface 230 or the wallet container 210 can execute one or more instructions to determine whether one or more of system cryptographic key 224 and the request token 232 are compatible with the wallet container 210. The request interface 230 can include a request token 232, and a request transmission 234.

The request token 232 can identify an NFT and can identify one or more characteristics linked with the NFT or corresponding to a request to allocate the NFT. For example, the request token 232 can include an identifier of the NFT, a hash of the NFT, an identifier of one or more accounts of the account system 104 linked with the NFT, one or more accounts of the account system 104 linked with the request to allocate the NFT, an identifier of a public-private key pair or any portion thereof, or any combination thereof. The request transmission 234 can transmit the request token 232 from the client system 103 or the mobile wallet system 170 to the data processing system 102 or the wallet container 210.

The account tokens 240 can identify various account characteristics and account operations. For example, the account tokens 240 can variously include an identifier of an smart contract, a hash of the smart contract, an identifier of one or more of the account objects 244 corresponding to accounts of the account system 104 linked with the NFT, one or more accounts of the account system 104 linked with the request to allocate the NFT, an identifier of a public-private key pair or any portion thereof, one or more request allocation metrics or any combination thereof. The account transmission 242 can include a technical improvement of at least including a format, protocol, or the like compatible with the account system 104, by detecting or transmitting aspects or characteristics of the particular accounts of the account system 104. The account objects 244 can identify various account records. For example, the account objects 244 can variously include an identifier of a financial account of the account system 104. For example, the account objects 244 can variously include metrics corresponding to a denomination or value of the account, and can include links or references to various objects associated therewith. For example, various objects associated with accounts can include NFTs, MBC, fiat currency, or any combination thereof.

The NFT transaction processor 250 can execute one or more actions with respect to various cryptographic keys, NFTs, containers, and smart contracts. For example, the NFT transaction processor 250 can modify links between various containers, NFTs, and smart contracts with various public-private key pairs. The transaction processor 250 can transfer public-private key pairs based on one or more operations of the cryptographic key processor 120, for example. The NFT transaction processor 250 can generate and modify one or more metrics corresponding to various NFTs, including wallet NFTs 212, gated NFTs 222, and exchange NFTs 240, based on one or more operations of the NFT feature processor 130 or the NFT metrics engine 140. The NFT transaction processor 250 can generate or modify one or more containers, accounts, or smart contracts, based on one or more operations of the smart contract engine 150.

The permission blockchain 260 can include at least one blockchain including one or more of the blocks 262. The permission blockchain 260 can be linked with one or more content objects 224, secure NFTs 240, and smart contract control structures 210. The permission blockchain 260 can include a blockchain operated and controlled at the data processing system 102. The permission blockchain 260 can include a plurality of blockchains each corresponding to particular aspects of the links associated with the corresponding blockchains. The permission blockchain 260 can include blocks 262, a wallet cryptographic key link 264, and a system cryptographic key link 266. The blocks 262 can include or store links to one or more objects associated with the blockchain. The wallet cryptographic key link 264 can include a reference, pointer, or the like, to or between a block among the blocks 262 and the wallet cryptographic key 214 associated with that particular block. The system cryptographic key link 266 can include a reference, pointer, or the like, to or between a block among the blocks 262 and the system cryptographic key 224 associated with that particular block. For example, the system can transfer, by the NFT transaction processor to the smart contract, one or more of the fractional value of the NFT and the second quantitative value of the NFT.

Figure 3:
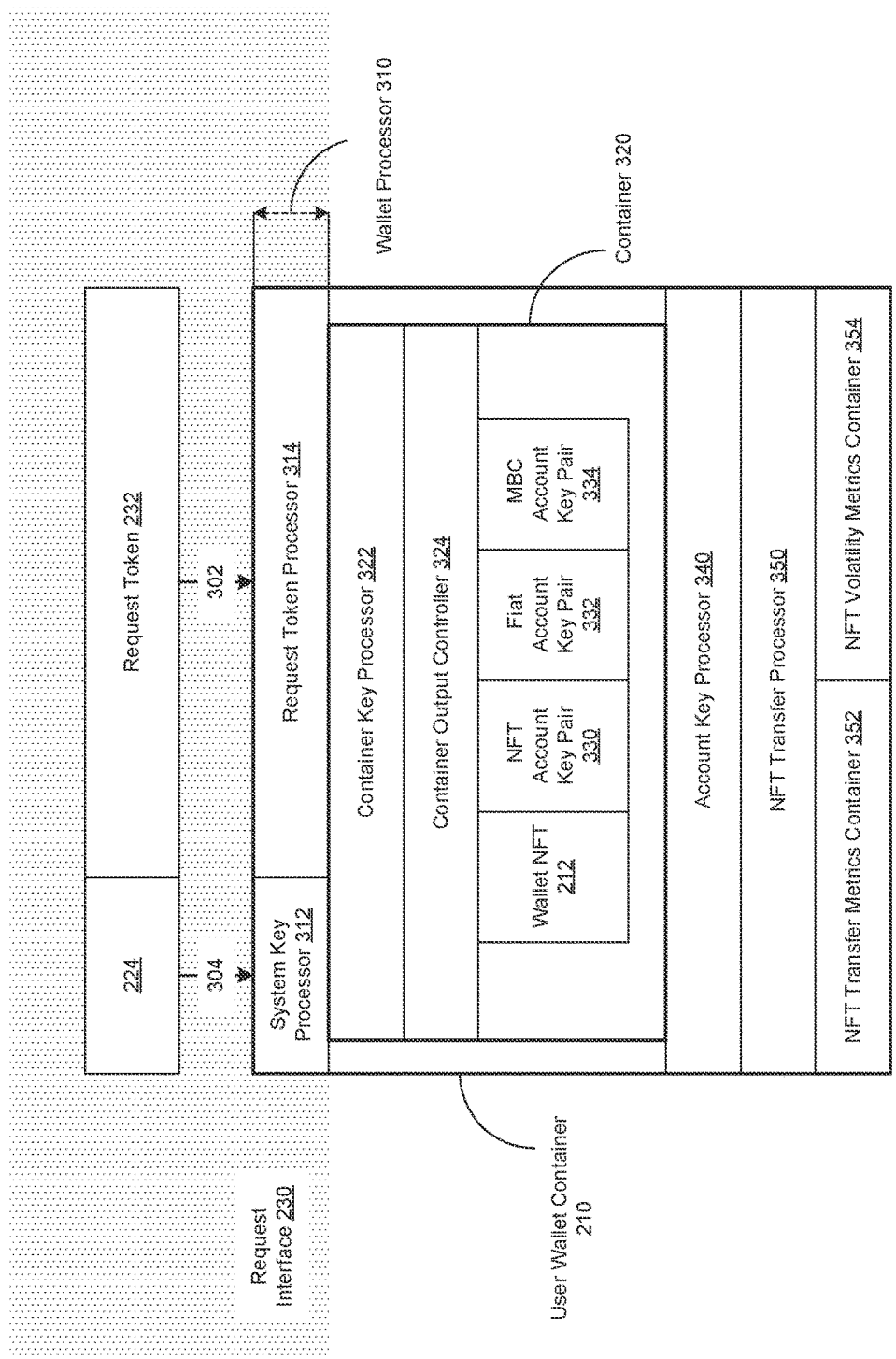
FIG. 3 depicts an example user wallet system architecture, in accordance with present implementations.

FIG. 3 depicts an example user wallet system architecture, in accordance with present implementations. As illustrated by way of example in FIG. 3, an example user wallet system architecture 300 can include at least a request token transmission 302, a system key transmission 304, a wallet processor 310, a container 320, a container key processor 322 320, an account key processor 340, and an NFT transfer processor 350. The request token transmission 302 can be responsive to an action by the request interface 230 to transmit the request token 232 to the wallet container 210. The system key transmission 304 can be responsive to an action by the request interface 230 to transmit the system cryptographic key 224 to the wallet container 210.

The wallet processor 310 can communicate with and validate various tokens and NFTs. The wallet processor 310 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The wallet processor 310 can comprise at least a portion of a control structure of the smart contract. The wallet processor 310 can include a system key processor 312, and a request token processor 314.

The system key processor 312 can detect the presence of the system cryptographic key 224, and can determine whether the system cryptographic key 224 is compatible with the system key processor 312. The system key processor 312 can be configured to be compatible with a particular system cryptographic key 224, or can be generated to be compatible with a particular system cryptographic key 224. For example, the system key processor 312 can be integrated with or store a hash based on a particular system cryptographic key 224 and a hash processor operable to generate a hash based on any system cryptographic key 224. For example, the system key processor 312 can include a public key or a private key of a key pair of a particular system cryptographic key 224, and can authenticate at least a portion of the system cryptographic key 224 based on a hash or comparison with the portion of the system cryptographic key 224. The system key processor 312 can generate a hash in response to detecting the presence of the system cryptographic key 224, and can determine whether the system cryptographic key 224 is compatible with the smart contract control structure, in response generating the hash, by comparing the generated hash with the stored hash. The system key processor 312 can include logic to detect a system cryptographic key 224 passed to it, by, for example, a JSON object or a header argument.

The request token processor 314 can detect the system cryptographic key 224 obtained by the wallet container 210 via the wallet processor 310. The request token transmission 302 can be responsive to an action by the request interface 230 to transmit the request token 232 to the wallet container 210. The request token processor 314 can detect the request token 232 obtained by the wallet container 210 via the request token processor 314. The wallet NFT 212 can correspond to at least one of the wallet NFTs 212.

The container 320 can include a security layer that restrict access to one or more of the NFTs or cryptographic keys. The container 320 can include, for example, a security encapsulation that partially or completely encrypts one or more components of the container 320. The container 320 can include the wallet NFT 212, a container key processor 322, a container output controller 324, an NFT account key pair 330, a fiat account key pair 332, and an MBC account key pair 334.

The container key processor 322 can detect the presence of a cryptographic key, and can determine whether the cryptographic key is compatible with the container 330. The container key processor 332 can obtain the cryptographic key from the request token 232, for example. For example, the private key can be stored entirely within the request token 250. For example, the request key can be stored entirely within the system cryptographic key 224 to restrict output from the container to the logical location corresponding to the system cryptographic key 224. For example, the cryptographic key can be stored partially within the system cryptographic key 224 and partially within the request token 232, to restrict output from the container to the logical location corresponding to the system cryptographic key 224 by a distributed key.

The container output controller 324 can selectively transfer at least NFTs and cryptographic keys from and to the container 320 based on determinations from the container key processor 322. For example, the container output controller 324 can transfer an NFT to the container 320 in response to a determination that the cryptographic key is compatible with the container key processor 322. The container 320 can include any number or combination of zero or more NFTs and zero or more keys, and is not limited to the examples illustrated herein.

The NFT account key pair 330 can correspond to a cryptographic key pair linked with a particular NFT account. For example, the NFT account key pair 330 can be executed at an account system to authorize a particular action at the account system. For example, an action can include transferring an NFT to a particular account or smart contract. For example, an action can include registering an NFT to a particular blockchain or user, or any combination thereof.

The fiat account key pair 332 can correspond to a cryptographic key pair linked with a particular fiat account. For example, the fiat account key pair 232 can be executed at an account system to authorize a particular action at the account system. For example, an action can include modifying an account database to indicate transfer of an amount of fiat currency to a particular account or smart contract. For example, an action can include registering a fiat currency account to a particular blockchain or user, or any combination thereof.

The MBC account key pair 334 can correspond to a cryptographic key pair linked with a particular MBC account. For example, the MBC account key pair 334 can be executed at an account system to authorize a particular action at the account system. For example, an action can include modifying an account database to indicate transfer of an amount of MBC currency to a particular account or smart contract. For example, an action can include registering an MBC currency account to a particular blockchain or user, or any combination thereof.

The account key processor 340 can generate, transfer, and modify various cryptographic keys. The account key processor 340 can transfer one or more of the account key pairs 330, 332 and 334 to or from the container 320 of the wallet container 210. For example, the account key processor 340 can transfer a cryptographic key pair, a public key, a private key, a symmetric key, or any combination thereof, to or from the container 320 to indicate a change in control of a particular account to the wallet container. The account key processor 340 can authenticate the wallet container 210 to a particular account system based on a key of the container 320. For example, the account key processor 340 can identify an NFT account associated with the NFT account key pair 330. For example, the account key processor 340 can transmit a hash based on the NFT account key pair 330 to an NFT account associated with the NFT account key pair 330, to authenticate the wallet container 210 to the NFT account associated with the NFT account key pair 330. The NFT transfer processor 350 can transfer and modify various NFTs. The NFT transfer processor 350 can transfer the wallet NFT to or from the container 320 of the wallet container 210. For example, the NFT transfer processor 350 can transfer an NFT in response to an indication by the account key processor 340 that the account is linked with and authorized to a particular NFT account.

The NFT transfer processor 350 can transfer and modify various NFTs. The NFT transfer processor 350 can transfer the wallet NFT 212 to or from the container 320 of the a user wallet container 210. For example, the NFT transfer processor 350 can transfer an NFT in response to an indication by the account key processor 340 that the wallet NFT 212 is linked with and authorized to a particular NFT account key pair. For example, the NFT transfer processor 350 can transfer an NFT in response to an indication by the account key processor 340 that the wallet NFT 212 is linked with and authorized to transfer from a specific user wallet container 210. For example, the NFT transfer processor 350 can transfer an NFT in response to an indication by the account key processor 340 that the wallet NFT 212 is linked with and authorized to transfer to the system wallet container 220. The NFT transfer processor 350 can include an NFT transfer metrics container 352, and an NFT volatility metrics container 354.

The NFT transfer metrics container 352 can store transfer metrics corresponding to various cryptographic keys and various NFTs. The transfer metrics can include values, templates, or any combination thereof corresponding to links of an NFT with various cryptographic keys. For example, the NFT allocation metrics container 440 can include links with user wallet containers 210 and system wallet containers 220. For example, the NFT transfer metrics container 352 can include a link with a system wallet container 220 to restrict transfer to the system wallet container 220.

The NFT volatility metrics container 354 can store volatility metrics corresponding various NFTs. The volatility metrics can include values corresponding to modifications to one or more NFT metrics. For example, the NFT volatility metrics container 354 can include quantitative value and a volatility metric corresponding to a percentage or fractional value linked with the wallet NFT 212. The fractional metric can indicate an amount to modify the quantitative value, and can be obtained by the NFT transfer processor in response to receiving the request token, for example, by modifying a quantitative value corresponding to a value of $100 by a fractional value of 0.75 to a modified quantitative value of $75. The NFT transfer metrics container 352 can transmit metrics and values of the NFT volatility metrics container 354. The NFT transfer metrics container 352 can receive and store metrics and values corresponding to the wallet NFT 212.

Figure 4:
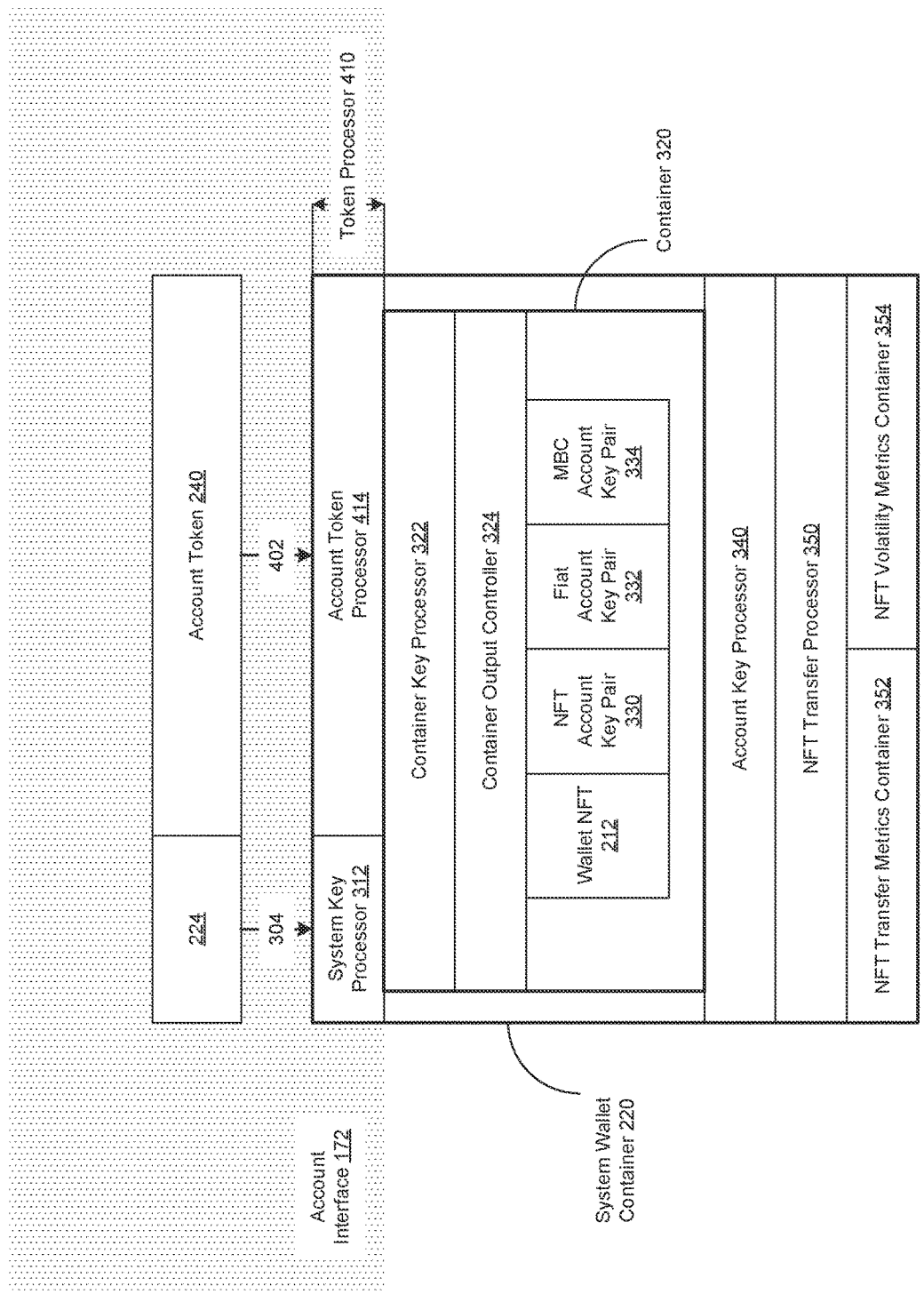
FIG. 4 depicts an example smart contract system architecture, in accordance with present implementations.

FIG. 4 depicts an example smart contract system architecture, in accordance with present implementations. As illustrated by way of example in FIG. 4, an example smart contract system architecture 400 can include at least the system key transmission 304, the account key processor 340, the NFT transfer processor 350, the NFT transfer ledger 352, the NFT volatility ledger 354, an account token transmission 402, and a token processor 410. The account token transmission 402 can be responsive to an action by the account interface 172 to transmit the account token 240 to the wallet container 210.

The token processor 410 can detect presence of a token, and can transmit the token to a token processor compatible with that particular token. The token processor 410 can include the system key processor 312, and an account token processor 414.

The account token processor 414 can detect the presence of the account token 240, and can extract one or more metrics, parameters, aspects, or values, or any combination thereof, from the account token 240. The NFT exchange token processor 414 can be configured to be compatible with the account token 240, the account interface 172, or the account system 104. Thus, the account token processor 414 can provide a technical improvement of direct communication between the data processing system 102, the mobile wallet system 170, and the account system 104. The account token processor 414 can include a token profile or account profile corresponding to a particular account system and compatible with a particular account token.

Figure 5:
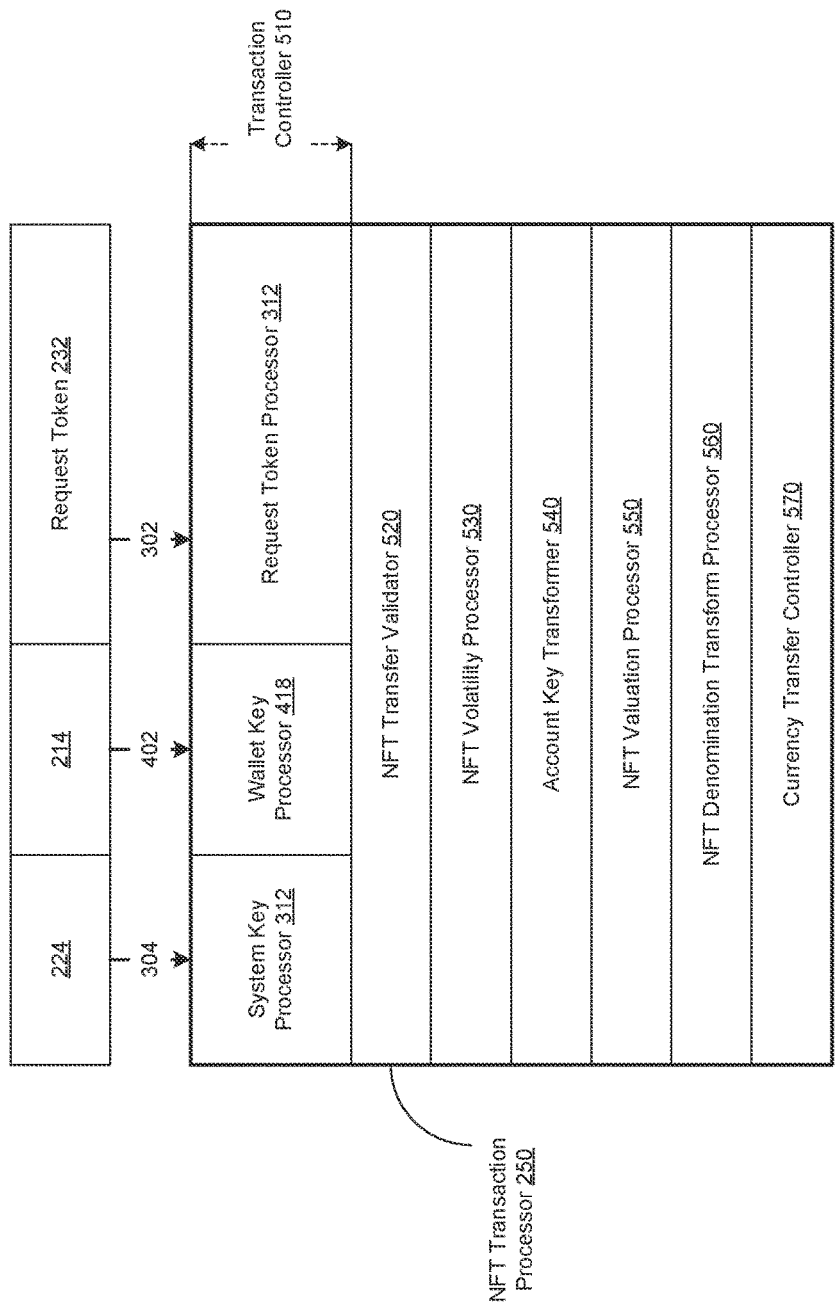
FIG. 5 depicts an example transaction processor, in accordance with present implementations.

FIG. 5 depicts an example transaction processor, in accordance with present implementations. As illustrated by way of example in FIG. 5, an example transaction processor 500 can include at least a transaction controller 510, an NFT transfer validator 520, an NFT volatility processor 530, an account key transformer 540, an NFT valuation processor 550, an NFT denomination transform processor 560, and a currency transfer controller 570.

The transaction controller 510 can detect presence of a token, and can transmit the token to a token processor compatible with that particular token. The transaction controller 510 can include the system key processor 312, the request token processor 314, and the wallet key processor 418.

The NFT transfer validator 520 can determine whether an NFT of the user wallet container 210 or the system wallet container 220 is compatible with a transfer. For example, the NFT transfer validator 520 can include one or more metrics indicating that NFTs having aspects or characteristics can be transferred to or from the user wallet container 210 or the system wallet container 220. For example, a particular NFT in the container 320 of the wallet container 210 may be incompatible with a transfer or restricted from transfer by a minting restriction. For example, the NFT transfer validator 520 can include or reference a transfer restriction linked with a minting restriction, and can block execution of a transfer of the NFT from or to the user wallet container 210 or the system wallet container 220 in response to detecting the minting restriction or transfer restriction. For example, the NFT transfer validator 520 can include or reference a transfer authorization linked with a minting parameter, and can permit or initiate execution of a transfer of the NFT from or to the user wallet container 210 or the system wallet container 220 in response to detecting the minting parameter linked with the transfer authorization. For example, the NFT transfer validator 520 can link with a wallet container 310 and receive an identification of or reference to a particular NFT. The NFT transfer validator 520 can then determine one or more characteristics or aspects of an NFT associated with a request to transfer that NFT, in response to receiving a transmission from or via the wallet container 320.

The NFT volatility processor 530 can generate various metrics based on an NFT and based on the NFT exchange token 416. For example, the NFT volatility processor 530 can request, via the NFT transfer metrics container 352, metrics corresponding to NFTs having particular aspects or characteristics, or NFTs linked with content objects having particular aspects or characteristics. The NFT volatility processor 530 can request the metrics in response to receiving aspects or characteristics of an NFT of the wallet container 310 via the NFT transfer validator 520. For example, the NFT volatility processor 530 can obtain a volatility metric that indicates a likelihood of transaction of an NFT having one or more aspects or characteristics corresponding to the wallet NFT. For example, the likelihood of transaction can correspond to a likelihood of transaction within a predetermined time period, e.g., a day, month, or year.

The account key transformer 540 can generate and modify one or more cryptographic keys associated with particular accounts or devices in communication with the smart contract engine 150. For example, the account key transformer 540 can identify a public-private key pair corresponding to a wallet container of a buyer of an NFT. The account key transformer 540 can modify one or more keys of the public-private key pair to link with a different account of the account system 104, an additional account of the account system 104, a substitute account of the account system 104, or any combination thereof.

The NFT valuation processor 550 can generate or modify a quantitative value corresponding to an NFT based on one or more metrics. The NFT valuation processor 550 can transform the volatility metric based on a similarity metric. For example, the similarity metric can indicate a percentage of aspects or characteristics present in one or more of the exchange NFTs having one or more aspects or characteristics corresponding to the wallet NFT. For example, the volatility metric can be decreased in response to a determination that a highly volatile exchange NFT has a number of aspects in common with the wallet NFT below a similarity threshold. The NFT valuation processor 550 can generate a quantitative value for a wallet NFT based on one or more quantitative values of exchange NFTs corresponding to or matching an aspect of the NFT or a content object associated therewith.

The NFT denomination transform processor 560 can generate or modify a quantitative value of an NFT. For example, the NFT denomination transform processor 560 can generate a quantitative value of an NFT corresponding to a value denominated in fiat currency or MBC currency. The quantitative value can be based on one or more of a quantitative value obtained from the NFT transfer metrics container 352, the NFT volatility metrics container 354, or any combination thereof.

The currency transfer controller 570 can generate one or more valuation metrics corresponding to quantitative values in various denominations. For example, the currency transfer controller 570 can generate a first valuation metric corresponding to the NFT based on a quantitative value of the NFT denominated in fiat currency, and a second valuation metric corresponding to the NFT based on a quantitative value of the NFT denominated in MBC currency. The currency transfer controller 570 can then provide an instruction to the account system 104 via, for example, a request token, to modify an account value at an account objects by an amount corresponding to the valuation metric. For example, the currency transfer controller 570 can instruct the account system 104 to reduce an account value at an account object of the account system 104. The currency transfer controller 570 can identify an account object corresponding to a particular user wallet container 210 or a particular system wallet container 220. For example, the currency transfer controller 570 can identify an account object corresponding to a particular user wallet container 210 or a particular system wallet container 220, based on an identifier of the wallet cryptographic key 214, the system cryptographic key 224, or any combination thereof.

Figure 6:
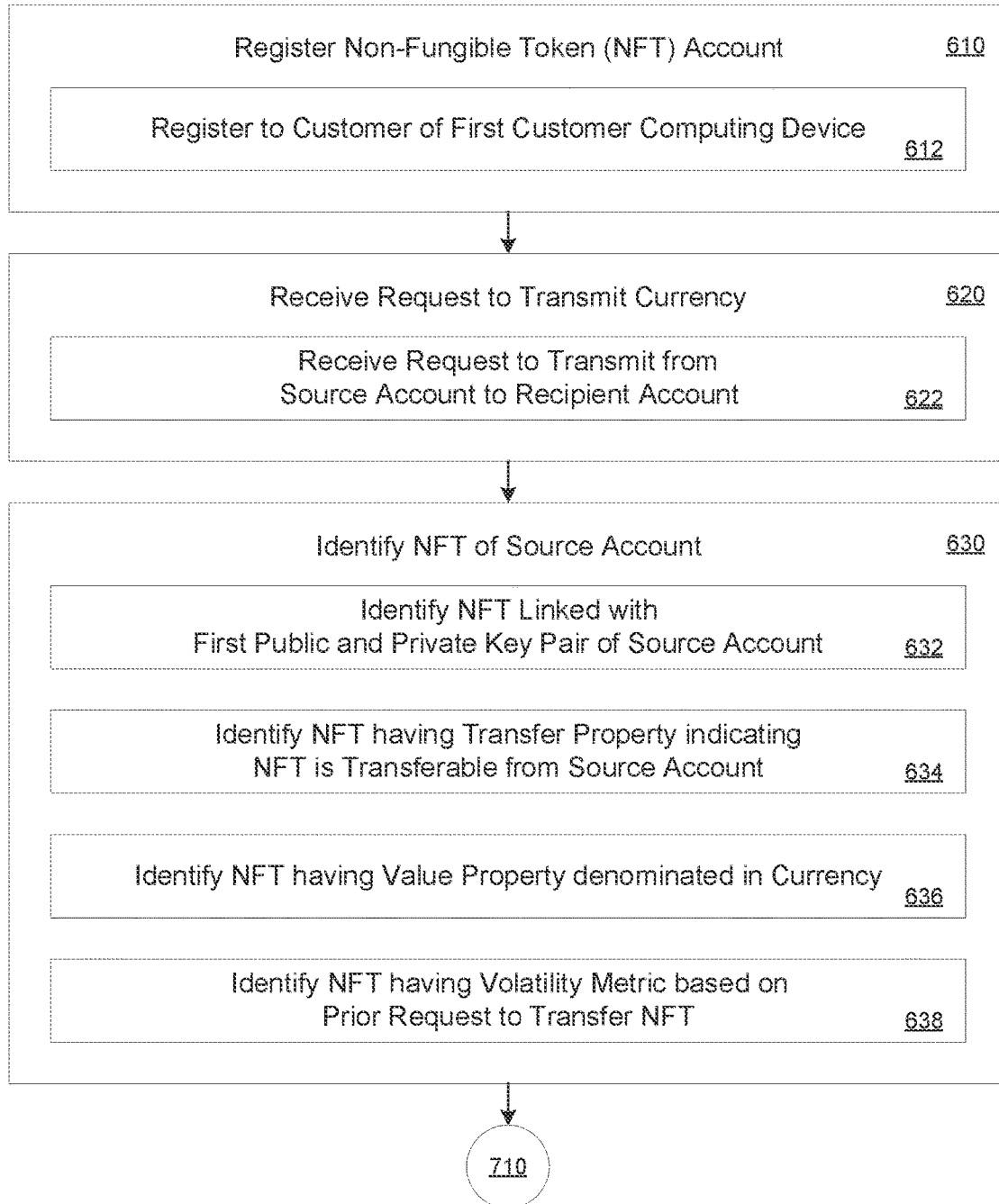
FIG. 6 depicts an example prepare an NFT for transfer, in accordance with present implementations.

FIG. 6 depicts an example prepare an NFT for transfer, in accordance with present implementations. At least one of the system 100 and the device 200 can perform method 600. At 610, the method 600 can register an NFT account. At 612, the method 600 can register an NFT account to a customer of a first customer computing device. At 620, the method 600 can receive a request to transmit currency. For example, the method can include receiving, by the NFT transaction processor via a communication interface compatible with an NFT transfer system external to the NFT transaction processor, the requests to transfer the NFT prior to or concurrently with the request. At 622, the method 600 can receive a request to transmit currency from a source account to a recipient account.

At 630, the method 600 can identify an NFT of a source account. At 632, the method 600 can identify an NFT linked with a first public and private key pair of a source account. At 634, the method 600 can identify an NFT having a transfer property indicating than an NFT is transferable from a source account. For example, the method can include generating, by the NFT transaction processor and based on the first public and private key pair, the transfer property to indicate that the NFT is transferable from the source account. For example, the method can include determining, by the NFT transaction processor, that a second NFT has a transfer property indicating that the second NFT is restricted to the source account. The method can include blocking, by the NFT transaction processor and in response to the determining that the second NFT has the transfer property indicating that the second NFT is restricted to the source account, selecting the NFT.

At 636, the method 600 can identify an NFT having a value property denominated in a currency. For example, the method can include determining, by the NFT transaction processor, that the value property indicates a higher value than one or more corresponding value properties of a plurality of NFTs can include the NFT. For example, the method can include selecting, by the NFT transaction processor from among the plurality of NFTs and in response to the determining that the value property indicates the higher value, the NFT.

At 638, the method 600 can identify an NFT having a volatility metric based on a prior request to transfer an NFT. For example, the method can include determining, by the NFT transaction processor, that the volatility metric indicates a lower volatility than one or more corresponding volatility metrics of a plurality of NFTs can include the NFT. For example, the method can include selecting, by the NFT transaction processor from among the plurality of NFTs and in response to the determining that the volatility metric indicates the lower volatility, the NFT. For example, the method can include determining, by the NFT processor and based on one or more requests to transfer corresponding ones of the plurality of NFTs, the corresponding volatility metrics of the plurality of NFTs.

Figure 7:
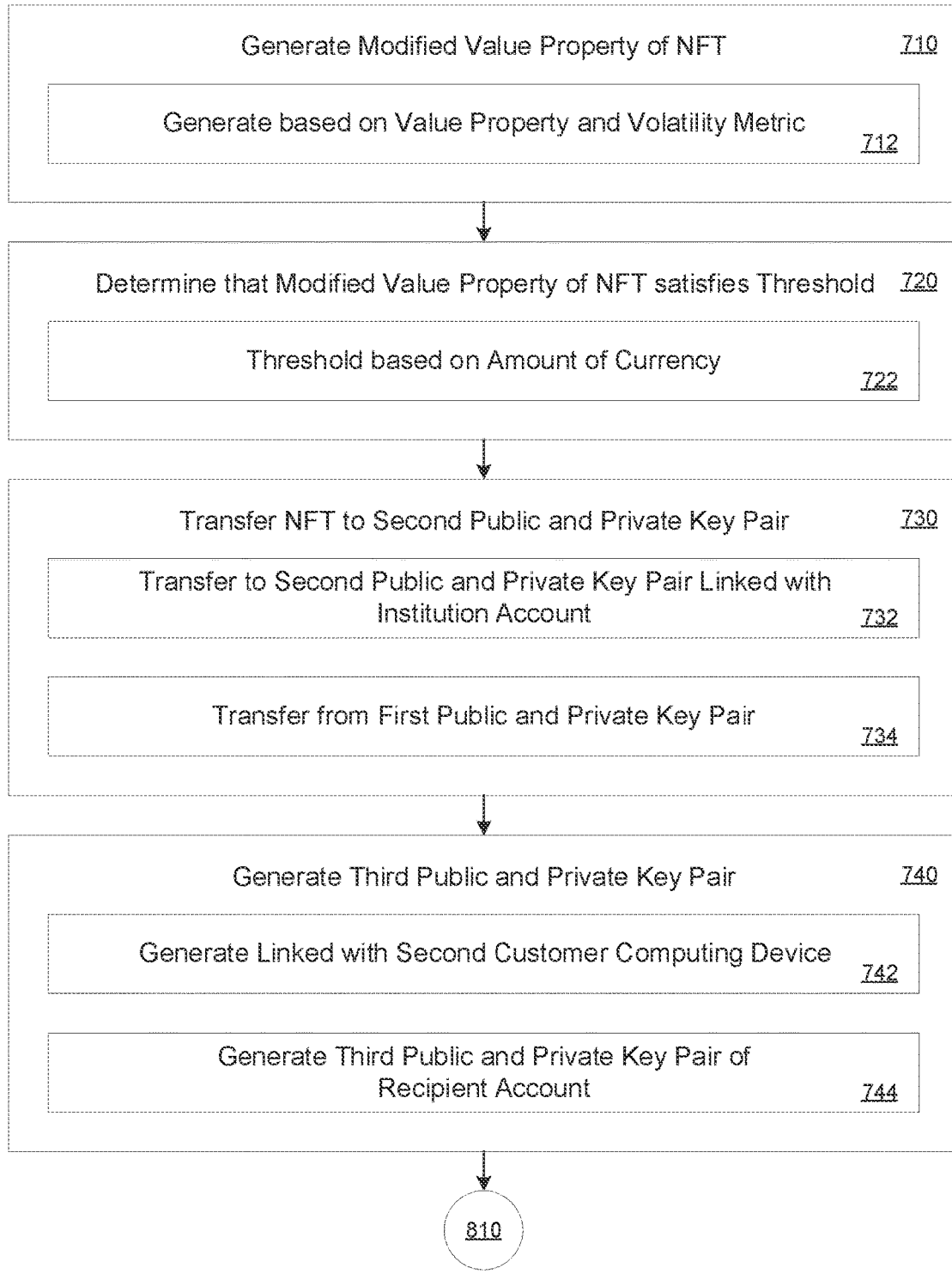
FIG. 7 depicts an example transfer an NFT, in accordance with present implementations.

FIG. 7 depicts an example transfer an NFT, in accordance with present implementations. At least one of the system 100 and the device 200 can perform method 700. At 710, the method 700 can generate a modified value property of an NFT. At 712, the method 700 can generate a modified value property of an NFT based on a value property and a volatility metric. For example, the method can include scaling, by the NFT transaction processor, the value property by the volatility metric into the modified value property.

At 720, the method 700 can determine that a modified value property of an NFT satisfies a threshold. At 722, the method 700 can determine that a modified value property of an NFT satisfies a threshold based on an amount of currency. For example, the threshold can correspond to a transaction request amount obtained via the request token. The technical solution can, for example, provide a technical improvement of at least validating a valuation of an NFT via a valuation metric based on various quantitative metrics linked with the NFT. Thus, the technical solution can provide a distributed control architecture across heterogeneous network systems to achieve at least the technical improvement of secure validation of NFT transfers with account systems denominated in any fiat or MBC currency, based on NFT valuation metrics that can be updated to maintain accuracy at any time.

At 730, the method 700 can transfer an NFT to a second public and private key pair. At 732, the method 700 can transfer an NFT to a second public and private key pair linked with an institution account. At 734, the method 700 can transfer an NFT from a first public and private key pair. At 740, the method 700 can generate a third public and private key pair. At 742, the method 700 can generate a third public and private key pair linked with a second customer computing device. At 744, the method 700 can generate a third public and private key pair of a recipient account.

Figure 8:
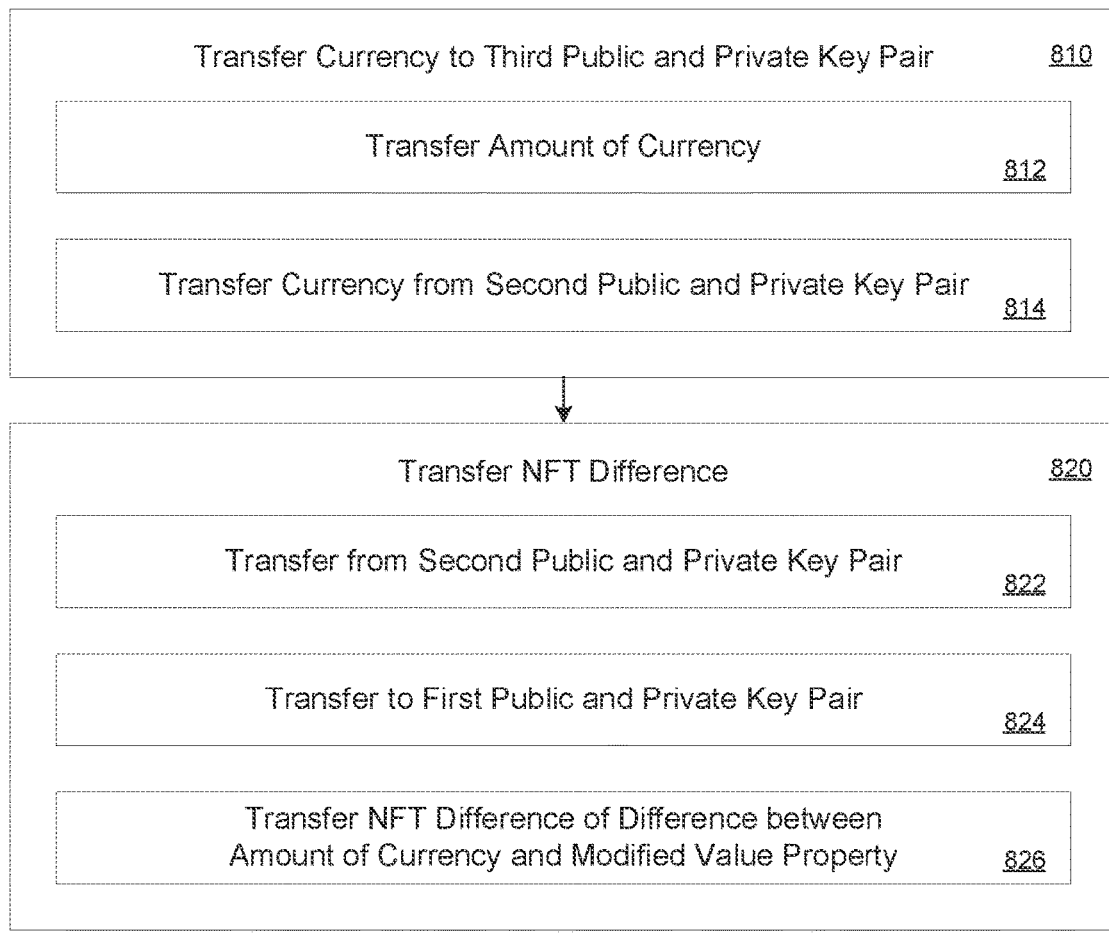
FIG. 8 depicts an example transfer currency based on an NFT transfer, in accordance with present implementations.

FIG. 8 depicts an example transfer currency based on an NFT transfer, in accordance with present implementations. At least one of the system 100 and the device 200 can perform method 800. At 810, the method 800 can transfer currency to a third public and private key pair. At 812, the method 800 can transfer an amount of currency. At 814, the method 800 can transfer currency from a second public and private key pair.

At 820, the method 800 can transfer an NFT difference. At 822, the method 800 can transfer an NFT difference from a second public and private key pair. At 824, the method 800 can transfer an NFT difference to a first public and private key pair. At 826, the method 800 can transfer an NFT difference of a difference between an amount of currency and a modified value property. The method can include transferring, by the NFT transaction processor, an NFT difference from the second public and private key pair to the first public and private key pair, the NFT difference equal to a difference between the amount of fiat currency and the modified value property.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of transferring an NFT in a financial institution from a source account associated with a first customer computing device to a recipient account associated with a second customer computing device, the method comprising:
   registering, by an account processor, a non-fungible token (NFT) account to a customer associated with the first customer computing device;
   receiving, by a mobile wallet computing system from the first customer computing device, a request to transmit an amount of fiat currency from the source account to the recipient account;
   identifying, by an NFT transaction processor, an NFT linked with a first public and private key pair associated with the source account, having a transfer property indicating that the NFT is transferable from the source account, having a value property denominated in fiat currency, and having a volatility metric based on one or more requests to transfer the NFT prior to or concurrently with the request;
   determining, by the NFT transaction processor, that a modified value property of the NFT based on the value property and the volatility metric satisfies a threshold based on the amount of fiat currency;
   transferring, by the NFT transaction processor in response to the determining, the NFT from the first public and private key pair to a second public and private key pair linked with the NFT transaction processor and associated with an institution account of the financial institution;
   generating, by the NFT transaction processor, a third public and private key pair linked with the second customer computing device and associated with the recipient account; and
   transferring, by the NFT transaction processor in response to the determining, the amount of fiat currency from the second public and private key pair to the third public and private key pair.

2. The method of claim 1, further comprising:
   transferring, by the NFT transaction processor, an NFT difference from the second public and private key pair to the first public and private key pair, the NFT difference equal to a difference between the amount of fiat currency and the modified value property.

3. The method of claim 1, further comprising:
   determining, by the NFT transaction processor, that the volatility metric indicates a lower volatility than one or more corresponding volatility metrics of a plurality of NFTs including the NFT; and
   selecting, by the NFT transaction processor from among the plurality of NFTs and in response to the determining that the volatility metric indicates the lower volatility, the NFT.

4. The method of claim 3, further comprising:
   determining, by the NFT processor and based on one or more requests to transfer corresponding ones of the plurality of NFTs, the corresponding volatility metrics of the plurality of NFTs.

5. The method of claim 1, further comprising:
   determining, by the NFT transaction processor, that the value property indicates a higher value than one or more corresponding value properties of a plurality of NFTs including the NFT; and
   selecting, by the NFT transaction processor from among the plurality of NFTs and in response to the determining that the value property indicates the higher value, the NFT.

6. The method of claim 1, further comprising:
   generating, by the NFT transaction processor and based on the first public and private key pair, the transfer property to indicate that the NFT is transferable from the source account.

7. The method of claim 1, further comprising:
   scaling, by the NFT transaction processor, the value property by the volatility metric into the modified value property.

8. The method of claim 1, further comprising:
   receiving, by the NFT transaction processor via a communication interface compatible with an NFT transfer system external to the NFT transaction processor, the requests to transfer the NFT prior to or concurrently with the request.

9. The method of claim 1, further comprising:
   determining, by the NFT transaction processor, that a second NFT has a transfer property indicating that the second NFT is restricted to the source account; and
   blocking, by the NFT transaction processor and in response to the determining that the second NFT has the transfer property indicating that the second NFT is restricted to the source account, selecting the NFT.

* * * * *